(12) United States Patent
Engendahl et al.

(10) Patent No.: US 11,370,996 B2
(45) Date of Patent: Jun. 28, 2022

(54) COMPOSITIONS INCLUDING KETO-ESTER COMPOUNDS AND METHODS OF USING THE SAME

(71) Applicant: FOURTH PRINCIPLE, LLC., Minnetonka, MN (US)

(72) Inventors: Bart Engendahl, Minnetonka, MN (US); Tess Fennelly, Minnetonka, MN (US)

(73) Assignee: FOURTH PRINCIPLE, LLC, Minneapolis, MN (US)

( * ) Notice: Subject to any disclaimer, the term of this patent is extended or adjusted under 35 U.S.C. 154(b) by 10 days.

(21) Appl. No.: 16/954,940

(22) PCT Filed: Dec. 22, 2018

(86) PCT No.: PCT/US2018/067416
§ 371 (c)(1),
(2) Date: Jun. 17, 2020

(87) PCT Pub. No.: WO2019/126815
PCT Pub. Date: Jun. 27, 2019

(65) Prior Publication Data
US 2020/0377823 A1 Dec. 3, 2020

Related U.S. Application Data

(60) Provisional application No. 62/609,995, filed on Dec. 22, 2017.

(51) Int. Cl.
*C11D 1/00* (2006.01)
*C11D 3/20* (2006.01)
(Continued)

(52) U.S. Cl.
CPC .......... *C11D 3/2093* (2013.01); *C11D 3/2003* (2013.01); *C11D 3/2072* (2013.01); *C11D 11/0023* (2013.01); *C11D 17/0008* (2013.01)

(58) Field of Classification Search
CPC .......... C11D 1/00; C11D 3/20; C11D 3/2006; C11D 3/2041; C11D 3/43; C11D 7/26;
(Continued)

(56) References Cited

U.S. PATENT DOCUMENTS

| 2,813,900 A | 11/1957 | Dunlop et al. |
| 3,549,693 A | 12/1970 | Eck et al. |
| 4,136,111 A | 1/1979 | Feldman |

(Continued)

FOREIGN PATENT DOCUMENTS

| GB | 423919 | * | 7/1935 |
| GB | 432025 A | | 7/1935 |

OTHER PUBLICATIONS

"ACULYNTM 28 Rheology Modifier/Stabilizer" Product Sheet. DOW® Feb. 2004, 11 pgs.
(Continued)

*Primary Examiner* — Brian P Mruk
(74) *Attorney, Agent, or Firm* — Mueting Raasch Group

(57) ABSTRACT

Compositions that include at least one low molecular weight to oxygen containing solvent and one or more compounds of formula (I) wherein R is a $C_1$-$C_6$ alkyl; X is a $C_1$-$C_{10}$ alkyl and n is an integer from 0 to 5. Methods of removing polymeric material containing heteroatoms from a surface by contacting the surface with such compositions and wiping the composition at least some portion of the polymeric material from the surface.

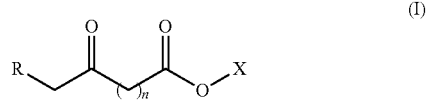

19 Claims, 3 Drawing Sheets

(51) Int. Cl.
  *C11D 3/43*  (2006.01)
  *C11D 7/26*  (2006.01)
  *C11D 7/50*  (2006.01)
  *B08B 3/04*  (2006.01)
  *C09D 9/00*  (2006.01)
  *C23G 5/032*  (2006.01)
  *C11D 11/00*  (2006.01)
  *C11D 17/00*  (2006.01)

(58) Field of Classification Search
  CPC .... C11D 7/50; B08B 3/04; C09D 9/00; C09D 9/005; C23G 5/032
  See application file for complete search history.

(56) References Cited

U.S. PATENT DOCUMENTS

| | | |
|---|---|---|
| 5,189,215 A | 2/1993 | Farnleitner et al. |
| 7,179,775 B2 | 2/2007 | Foster |
| 8,834,635 B2 | 9/2014 | Bayarri Ferrer et al. |
| 10,376,931 B2 | 8/2019 | Ludwig et al. |
| 2012/0202729 A1 | 8/2012 | Bourdette et al. |
| 2014/0123998 A1* | 5/2014 | Bayarri Ferrer ....... C23G 5/032 560/174 |
| 2014/0274855 A1 | 9/2014 | Schumann et al. |

OTHER PUBLICATIONS

International Search Report and Written Opinion issued for PCT/US2018/067416 by the U.S. Patent Office as the International Search Authority, dated Jun. 14, 2019; 10 pgs.

* cited by examiner

COMPOSITIONS INCLUDING KETO-ESTER COMPOUNDS AND METHODS OF USING THE SAME

PRIORITY

This application is the § 371 U.S. National Stage of International Application No. PCT/US2018/067416, filed 22 Dec. 2018, which claims priority to U.S. Provisional Application No. 62/609,995 filed on Dec. 22, 2017, the disclosures of which are incorporated herein by reference thereto.

SUMMARY

Disclosed herein are compositions that include at least one low molecular weight oxygen containing solvent and one or more keto-ester compounds.

Disclosed herein are compositions that include at least one low molecular weight oxygen containing solvent and one or more compounds of formula (I)

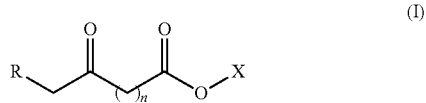

wherein R is a $C_1$-$C_6$ alkyl; X is a $C_1$-$C_{10}$ alkyl and n is an integer from 0 to 5.

Also disclosed herein are methods of removing polymeric materials containing heteroatoms from a surface, the method comprising contacting the surface with a disclosed composition; and wiping the composition and at least some portion of the polymeric material from the surface.

Disclosed compositions can be useful for removal of polymeric materials containing heteroatoms for example. As such, also disclosed are methods of removing polymeric materials from one or more surfaces.

The above summary is not intended to describe each embodiment of the present disclosure. The details of one or more embodiments of the present disclosure are also set forth in the description below. Other features, objects, and advantages of the present disclosure will be apparent from the description and from the claims.

BRIEF DESCRIPTION OF DRAWINGS

The disclosure may be more completely understood in consideration of the following detailed description of various illustrative embodiments in connection with the accompanying drawings, in which.

DETAILED DESCRIPTION

Figure 1:
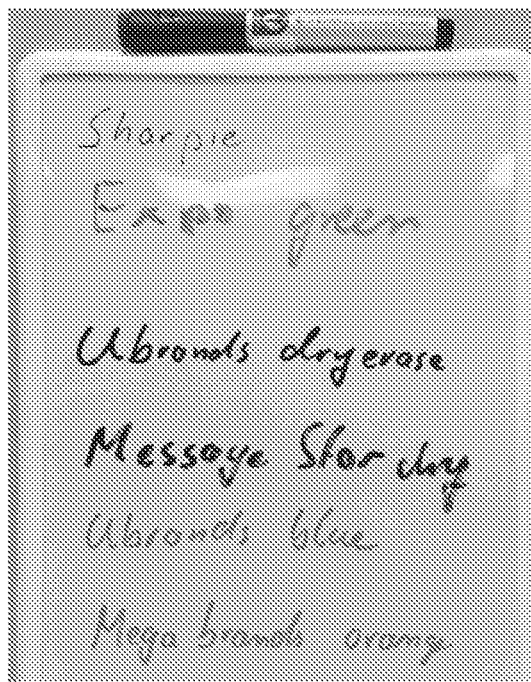
FIG. 1 shows a whiteboard before cleaning with a composition for removal of a polymeric material containing heteroatoms and competitive products.

Disclosed herein are compositions comprising keto-carboxylic acid esters that are safe, have low toxicity and can effectively remove polymeric materials containing heteroatoms. Employing a keto-carboxylic acid provides a composition for the removal of polymeric materials containing heteroatoms that does not contain substances known to be harmful to the environment or humans. Disclosed compositions are non-flammable and are not considered volatile organic compounds (VOC). Nevertheless, the compositions act effectively in removing polymers containing heteroatoms as fast or faster than current alternatives based on toxic, sensitizing and often volatile chemicals.

Disclosed compositions can be useful to remove polymeric materials that include one or more heteroatoms from a surface. Inks, paints, coatings and glues are polymeric materials containing one or more heteroatoms that are designed to adhere to surfaces and either protect them from external influences like weather, UV radiation, water and chemicals or provide decorative elements or other advantages. In order for these materials to effectively function, they themselves have to adhere strongly to the surfaces and resistant these influences or provide the decorative element without alteration for the envisioned lifetime.

Commonly utilized compositions for removing materials comprising polymers containing heteroatoms such as coatings, adhesives or inks are harmful and are generally not safe for use in industrial or home environments. The content of these compositions often contains substances such as mineral spirits, dichloromethane, d-limonene, N-methylpyrrollidone, methanol and other substances making the resulting compositions volatile, flammable, toxic, sensitizing or carcinogenic. Many product labels or safety data sheets (SDS) of currently utilized compositions specify the use of extensive personal protective equipment when applying and working with the product. This extensive personal protective equipment relates to face shields due to eye irritant substances in the composition or devices for respiratory protection to prevent inhalation of the substances. Users, especially users in a home and household environment, are not aware or trained in the use of personal protective equipment or do not have access to it. This puts them at harm when using the widely accessible current products. It is the intention of the present invention to provide a composition to remove a polymeric material containing heteroatoms such as coatings, adhesives or inks where the use of extensive personal protective equipment in not required.

While other compositions are known to be less harmful than the ones described in the paragraph above, these often have long wait times between applying the composition and removing a polymeric material containing heteroatoms. It is the further intention of the inventors to disclose a safe, low toxicity composition for removing a polymeric material containing heteroatoms, that exhibits the same or lower wait times between applying the safe, low toxicity composition for removing a polymeric material containing heteroatoms as the incumbents which employ methanol, dichloromethane or d-limonene.

Disclosed herein are safe, low toxicity, nonflammable compositions for removing a polymeric material containing heteroatoms, excluding the use of substances considered highly volatile, toxic, sensitizing or considered to cause cancer. Disclosed compositions have been shown to be particularly advantageous in comparison to commonly utilized polymer removal compositions because of the speed at which the polymers are dissolved and removed as well as the inherent safety of the compositions.

Disclosed herein are compositions that can be useful for removing polymeric material containing heteroatoms. Disclosed compositions include at least one low molecular weight oxygen containing solvent; and at least one keto-ester compound of formula (I)

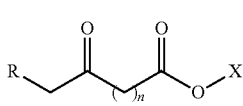
(I)

wherein R is a C1-6 alkyl; X is a C1-10 alkyl, and n is an integer from 0 to 5. In some embodiments, disclosed compositions can also include optional components selected surfactants, co-solvents, emollients, chelating agents, preservatives, oxidants, processing aids, thickeners or combination thereof.

Disclosed compositions can be useful for the safe, low toxicity removal of polymeric materials containing heteroatoms, especially inks, paint, coatings and glues, from surfaces such as wood, metal, concrete, plasterboard, masonry, plastics and many more.

Disclosed compositions can include one or more keto-carboxylic acid esters of formula I

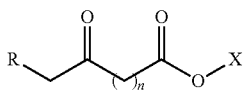
(I)

wherein R is a C1-6 alkyl; X is a C1-10 alkyl, and n is an integer from 0 to 5.

In some disclosed embodiments n can be 1 or 2. In some disclosed embodiments n can be 1 or 2, R can be a C1-C6 alkyl, and X can be C1 alkyl, e.g., methyl. In some embodiments, n can be 2, R can be a C2-C4 alkyl, and X can be a C1 alkyl, e.g., methyl.

In some disclosed embodiments, the compound of formula I can be the compound of formula II, which is butyl levulinate.

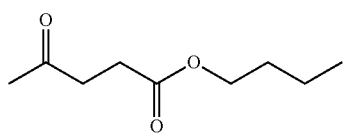
(II)

Butyl levulinate has been demonstrated as safe. U.S. Pat. No. 8,834,635, the disclosure of which is incorporated herein by reference thereto includes a table showing data from toxicity studies.

Compounds of formula I can be synthesized by esterification of the keto-carboxylic acid with the corresponding alcohol. Examples of keto-carboxylic acids include, for example, pyruvic acid, acetoacetic acid, and levulinic acid. Keto-carboxylic acids can be obtained from natural resources (see for example U.S. Pat. Nos. 4,136,111, and 2,813,900, the disclosures of which are incorporated herein by reference thereto) or can be synthesized from petrochemical resources (see for example, U.S. Pat. Nos. 5,189,215 and 3,549,693, the disclosures of which are incorporated herein by reference thereto).

Disclosed compositions also include one or more low molecular weight, oxygenated solvents. The inclusion of the one or more low molecular weight, oxygenated solvents may improve the ability of the composition to remove polymeric materials while significantly reducing the time necessary to dissolve or lift the polymers from the surface. Inclusion of at least one low molecular weight solvent can also enhance the compatibility of the composition with surfaces such as engineered thermoplastics and elastomers.

A low molecular weight solvent is one that has a molecular weight of not greater than 130 g/mol. In some embodiments useful solvents can include those that have an atomic weight due to oxygen of at least 20% with respect to the entire molecule, in some embodiments, useful solvents can have an atomic weight due to oxygen of at least 25% with respect to the entire molecule, or in some embodiments useful solvents can have an atomic weight due to oxygen of at least 50% with respect to the entire molecule. In some embodiments useful solvents include one oxygen atom.

Illustrative specific examples of low molecular weight oxygen containing solvents that can be utilized include alcohols such as ethanol, ethylene glycol, 2-propanol, 1,2-propanediol, 1,3-propanol, propylene glycol, 1,2-butanediol, 1,3-butanediol, and glycerol; and glycol ethers such as methyl-propylene glycol, dipropylene glycol; water; or combinations thereof. In some embodiments the oxygen containing solvent includes ethanol, 2-propanol, water, or combinations thereof. In some embodiments the oxygen containing solvent is water. In some embodiments the oxygen containing solvent is a mixture of two or more oxygen containing solvents.

In some embodiments, disclosed compositions can include not less than 20% by weight of at least one low molecular weight oxygen containing solvent with respect to the total weight of the composition, or not less than 50% by weight of at least one low molecular weight oxygen containing solvent with respect to the total weight of the composition. In some embodiments, disclosed compositions can include not greater than 95% by weight of at least one low molecular weight oxygen containing solvent with respect to the total weight of the composition, or not greater than 75% by weight of at least one low molecular weight oxygen containing solvent with respect to the total weight of the composition. In some embodiments, disclosed compositions that include from 20% by weight to 75% by weight based on the total weight of the composition can be useful for removing polymeric materials containing heteroatoms from surfaces such as wood, masonry, concrete, leather, glass or stone, for example.

Disclosed compositions can also include one or more optional components. Illustrative optional components that can be included in disclosed compositions can include, for example surfactants, co-solvents, emollients, chelating agents, preservatives, oxidants, processing aids, thickeners, or combinations thereof.

Illustrative surfactants that can optionally be included in disclosed compositions include, for example one or more of the following: fatty acid alcohols, ethoxylated fatty acid alcohols, C8-C18 ethoxylated alcohols, esters and ethoxylated esters of sugar polyols and fatty acids, salts of fatty acids, C4-C18 fatty acid alkyl esters, amines and alkylated amines of C8-C18 alcohols, C1-C18 alkylated glucosides and poly glucosides, C4-C18 alkylated aromatic sulfonic acid salts, betaines, polyol-mono esters of fatty acids, branched polyethyleneglycol alkyl ethers. More specifically the surfactant may be chosen from the list of the following 1-hydroxydodecanesulfonic acid sodium salt, the inner salts of 3-amino-N-(carboxymethyl)-N,N-dimethyl-N—(C8-18 and C18-unsaturated acyl) 1-propanaminium (CAS 147170-44-3), the chlorides and sodium salts of 3-amino-N-(carboxymethyl)-N,N-dimethyl-N-coco-acyl-1-Propanaminium (CAS 61789-39-7), the inner salts of 3-amino-N-(carboxymethyl)-N,N-dimethyl-N-coco-acyl-1-Propanaminium (CAS 61789-40-0), the inner salt of N-(carboxymethyl)-N,N-dimethyl-3-[(1-oxodecyl)amino]-1-Propanaminium (CAS 73772-45-9), the inner salt of N-(carboxymethyl)-N,N-dimethyl-3-[(1-oxooctyl)amino]-1-Propanaminium (CAS 73772-46-0), 2-Ethylhexyl-alpha-D-glucoside, 2-Ethylhexyl-poly-D-glucosides, 9-Eicosenoic acid, 2-Chloroacetic acid reaction products with 2-heptyl-4,5-dihydro-1H-imidazole-1-ethanol and sodium hydroxide (CAS 68608-64-0), sodium salt of Chloroacetic acid reaction products with 4,5-dihydro-2-undecyl-1H-imidazole-1-ethanol and sodium hydroxide, C10-12 ethoxylated propoxylated Alcohols, C10-14 ethoxylated Alcohols, C10-16 ethoxylated Alcohols, C10-16 ethoxylated propoxylated Alcohols, C11-14-iso-C13-rich ethoxylated Alcohols, C11-15-secondary ethoxylated Alcohols, C12-13 ethoxylated Alcohols, C12-14 ethoxylated Alcohols, C12-14 ethoxylated propoxylated Alcohols, C12-14-secondary ethoxylated Alcohols, C12-15 ethoxylated Alcohols, C12-15 ethoxylated propoxylated Alcohols, C12-15-branched and linear ethoxylated propoxylated Alcohols, C12-16 ethoxylated Alcohols, C12-16 ethoxylated propoxylated Alcohols, C12-18 Alcohols, C12-18 ethers with polyethylene glycol mono-Bu ether Alcohols, C12-18 ethoxylated Alcohols, C14-15 ethoxylated Alcohols, C16-18, ethoxylated Alcohols, C6-10 ethoxylated Alcohols, C6-10 ethoxylated propoxylated Alcohols, C6-12 ethoxylated Alcohols, C6-12 ethoxylated and propoxylated Alcohols, C8-10 ethoxylated Alcohols, C8-10 ethoxylated propoxylated Alcohols, C8-16 ethoxylated Alcohols, C8-18 ethoxylated propoxylated Alcohols, C9-11 ethoxylated Alcohols, Alkyl(C12-C16)alcohol sulfate sodium salt, alkylation products with chloroacetic acid N-[3-(dimethylamino) propyl] coco amides sodium salts, C10-16-alkyldimethyl-N-oxides-amines C12-18-alkyldimethyl-N-oxides-amines, coco alkyl dihydroxyethyl oxides amines, Ammonium cumene sulfonate, Ammonium lauryl sulfate, Ammonium xylenesulfonate, monosulfo derivative of the sodium salt (1:1) of (1-methylethyl)-Benzene, 4-C10-13-sec-alkyl derivatives of Benzenesulfonic acid, sodium salts of 4-C10-13-sec-alkyl derivatives of Benzenesulfonic acid, odium salts of the C10-14-alkyl derivatives of Benzenesulfonic acid C10-16-alkyl derivatives of Benzenesulfonic acid, magnesium salts of the C10-16-alkyl derivatives of Benzenesulfonic acid, sodium salts of the mono-C10-16-alkyl derivatives of Benzenesulfonic acid, sodium salt (1:1) of N-(2-carboxyethyl)-N-(2-ethylhexyl)-beta-Alanine, C10-16-alkyl(2-hydroxy-3-sulfopropyl)dimethyl Betaines, coco alkyldimethyl Betaines, Bis(1-methylamyl) sodium sulfosuccinate, Disodium salts of mono(C10-C16)alkyl ethoxylated ester sulfo Butanedioic acid, Butyl D-glucoside, Butyl poly-D-glucosides, sodium salts of C10-13 Alkyl benzenesulfonic acid, C10-16 Alkyl-poly-D-glucosides, C12-14 Alkyl-poly-D-glucosides, C12-16 Alkyl-poly-D-glucosides, C6-12 Alkyl-poly-D-glucosides, C8-10 Alkyl-poly-D-glucosides, C8-16 Alkyl-poly-D-glucosides, C9-11 Alkyl-poly-D-glucosides, Calcium xylene sulfonate, Capric dimethyl amine oxide, ethoxylated Castor oil, sodium salt of sulfated Castor oil, Cetamine oxide, Cetearyl glucoside, Cocamidopropyl hydroxysultaine, Cocamidopropylamine oxide, Cocamine oxide, ethoxylated Coconut fatty acids, Coconut oil sodium salt, Cyclocarboxypropyloleic acid, sodium salts of oligomeric 6-(dihydrogen 2-hydroxy-1,2,3-propanetricarboxylate)-1-(coco alkyl) ethers D-Glucopyranose, sodium salts of oligomeric C10-16-alkyl glycosides 2-hydroxy-3-sulfopropyl ethers D-Glucopyranose, oligomeric heptyl glycosides D-Glucopyranose, Decanoic acid, Decanoic acid potassium salt (1:1), Decyl glucoside, Decyl-octyl-poly-D-glucosides, Decyl-poly-D-glucosides, Decylbenzenesulfonic acid, Diethylene glycol monolauryl ether sodium sulfate Disodium cocoyl glutamate, Disodium lauriminodipropionate, Distearoylethyl hydroxyethylmonium methosulfate, Docosanoic acid, Dodecanoic acid, Dodecanoic acid sodium salt, Dodecene-1-sulfonic acid sodium salt, ethoxylated Dodecyl alcohol, Dodecyl triethylene glycol ether, Dodecyl-beta-D-glucoside, Dodecylbenzene sulfonic acid, Eicosanoic acid, methyl sulfates of 2-hydroxy-N,N-bis(2-hydroxyethyl)-N-methyl-Ethanaminium esters with C16-18 and C18 unsatd. fatty acids, (salts), Me esters of 2-hydroxy-N-(2-hydroxyethyl)-N,N-dimethyl-Ethanaminium diesters with C16-18 and C18-unsatd. fatty acids, chlorides of 2-hydroxy-N-(2-hydroxyethyl)-N,N-dimethyl-Ethanaminium esters with C16-18 and C18-unsatd. fatty acids, chlorides of N,N-dimethyl-2-[(1-oxohexadecyl)oxy]-N-[2-[(1-oxohexadecyl)oxy]ethyl]-Ethanaminium, chloride (1:1) of N,N-dimethyl-2-[(1-oxooctadecyl)oxy]-N-[2-[(1-oxooctadecyl) oxy]ethyl]-Ethanaminium, Ethylene glycol monopalmitate, Ethylene glycol monostearate, C10-16 Fatty acids, C10-20 and C16-18-unsaturated Fatty acids reaction products with di-Me sulfate-quaternized triethanolamine, sodium salts of sulfonated C12-18 fatty acid methyl esters, C12-20 Fatty acids reaction products with di-mesulfate-quaternized triethanolamine, C14-18 and C16-18-unsatd. Fatty acids, C16-C18 and C18 unsaturated branched and linear Fatty acids, C16-18 Fatty acids, C16-18 and C18-unsaturated Fatty acids, C8-18 and C18-unsaturated Fatty acids, coco Fatty acids, coco Fatty acids sodium salts, coconut oil Fatty acids potassium salts, sodium salt of coconut oil Fatty acids sulfoethyl esters, sodium salts of olive-oil Fatty acids, sodium salts of sulfonated palm kernel-oil Fatty acids methyl esters, sodium salts of palm-oil Fatty acids, sodium salts of safflower-oil Fatty acids, sodium salts of tall oil Fatty acids, tall-oil Fatty acids, potassium salts of tall-oil Fatty acids, tallow Fatty acids, compounds of hydrogenated tallow Fatty acids with triethanolamine, sodium sal of tallow Fatty acids, Gardol, C14-18 mono- and di-Glycerides, C16-18 and C18-unsatd. mono- and di-Glycerides, C16-18 mono- and di-Glycerides, C8-18 and C18-unsatd. mono- and di-Glyceride acetates, hydrogenated castor-oil mono-Glycerine acetates, Glycerine oleate, Glyceryl monolaurate, Glyceryl monooleate, Glyceryl monooleate [NF], Glyceryl monostearate, Glyceryl monostearate, Glyceryl stearates, Glycine N-methyl-N-coco acyl derivatives, Glycol distearate, Heptadecanoic acid, Hexanoic acid, Hexyl D-glucoside, Hexyl poly(oxyethylene) ether, hydroxides and disodium salts of 1-[2-(2-carboxyethoxy)ethyl]-1-(or 3)-(2-carboxyethyl)-4,5-dihydro-2-norcoco alkyl Imidazolium compounds, Isopropanol Lauramidopropyl betaine, Lauramidopropylamine oxide, Lauryl glucoside, Lauryl hydroxysultaine, Lauryldimethylbetaine, Lecithins, Lignoceric acid, Linoleic acid, Linolenic acid, Magnesium lauryl sulfate, Magnesium stearate, Myristamido propylamine oxide, Myristamidopropyl betaine, Myristoleic acid, Myristyl alcohol, ethoxylated, N,N-Dimethyl-1-tetradecanamine-N-oxide, N,N-Dimethyldodecylamine oxide, monosodium salt of N-(3-Alkyl(C12-C15)oxypropyl)-3-iminodipropionic acid, n-Octylpolyoxyethylene, N-Octylpyrrolidone, Octanoic acid, Octanoic acid monoester with 1,2,3-propanetriol, Octanoic acid potassium salt, disodium salts of reaction products of octanoic acid with 2-[(2-aminoethyl)amino]ethanol and alkylated acrylic acid (1:2), Octyl-beta-D-glucoside, Octyldimethylamine oxide, Octyldimethylbetaine, Oleic acid, Oleic acid sodium salt, 2-methyl-Oxirane polymer with mono(2-propylheptyl) ether oxirane, methyl-Oxirane polymer with mono(2-ethylhexyl) ether oxirane, Palmitic acid, Poloxalene, alpha-(3-carboxy-1-oxo-3-sulfopropyl)-omega-(dodecyloxy)-Poly(oxy-1,2-thanediyl) disodium salt, alpha-(carboxymethyl)-omega-(octyloxy)-Poly(oxy-1,2-ethanediyl), alpha-decyl-omega-hydroxy-Poly(oxy-1,2-ethanediyl), ammonium salts of alpha-sulfo-omega-hydroxy-Poly(oxy-1,2-ethanediyl) C10-16-alkyl ethers, ammonium salts of alpha-sulfo-omega-hydroxy-Poly(oxy-1,2-ethanediyl) C6-10-alkyl ethers, alpha-(2-propylheptyl)-omega-hydroxy-Poly(oxy-1,2-ethanediyl), disodium salts of alpha-(3-carboxy-1-oxosulfopropyl)-omega-hydroxy-Poly(oxy-1,2-ethanediyl) C10-12-alkyl ethers, alpha-(carboxymethyl)-omega-hydroxy-Poly(oxy-1,2-ethanediyl) C12-13-alkyl ethers, alpha-(carboxymethyl)-omega-hydroxy-Poly(oxy-1,2-ethanediyl) C12-14-alkyl ethers, alpha-butyl-omega-(octyloxy)-Poly(oxy-1,2-ethanediyl), alpha-hydro-omega-hydroxy-Poly(oxy-1,2-ethanediyl) mono-C8-10-alkyl ethers ethers with 1,2-dodecanediol (1:1), branched alpha-tridecyl-omega-hydroxy-Poly(oxy-1,2-ethanediyl), branched and linear alpha-undecyl-omega-hydroxy-Poly(oxy-1,2-ethanediyl), Polyethylene glycol distearate, Polyethylene glycol mono(tridecyl) ether, Polyethylene glycol mono-C10-16-alkyl ether sulfate sodium salt, Polyethylene glycol mono-C12-14-alkyl ether sulfate sodium salt, Polyethylene glycol monoisotridecyl ether, Polyethylene glycol monooleyl ether, Polyethylene glycol stearate, Polyoxyethylene dioleate, Polyoxyethylene monoleate, Polyoxyethylene monooctadecyl ether, Polyoxyethylene monoundecyl ether, Polyoxyethylene sorbitan trioleate, Polysorbate 80, Potassium acrylinoleate, Potassium babassuate, Potassium dodecanoate, Potassium dodecylbenzene sulfonate, Potassium heptadecanoate, Potassium linoleate, Potassium myristate, Potassium palmitate, Potassium palmitoleate, Potassium toluenesulfonate, Potassium xylene sulfonate, 2-hydroxy-Propanoic acid 2-(C10-16-alkyloxy)-1-methyl-2-oxoethyl ester, Quaternary ammonium compounds of ethoxylated bis(hydroxyethyl)methyltallow alkyl methyl sulfates (salts), Quaternary ammonium compounds of ethoxylated coco alkylbis(hydroxyethyl)methylchlorides, Sodium 1-methoxy-1-oxohexadecane-2-sulphonate, Sodium 1-octanesulfonate, Sodium cocoyl glutamate, Sodium cumene sulfonate, Sodium decanoate, Sodium dodecylpoly(oxyethylene) sulfate, Sodium ethasulfate, Sodium laurimino dipropionate, Sodium lauroyl glutamate, Sodium lauroyl lactylate, Sodium lauroyl methyl isethionate, Sodium lauryl benzene sulfonate, Sodium lauryl sulfate, Sodium lauryl trioxyethylene sulfate, Sodium linoleate, Sodium methyl cocoyl taurate, Sodium myristate, Sodium myristol sarcosinate, Sodium octanoate, Sodium octyl sulfate, Sodium palmitate, Sodium polyoxyethylene tridecyl sulfate, Sodium stearate, Sodium toluenesulfonate, Sodium tridecylbenzene sulfonate, Sodium undecylbenzene sulfonate, Sodium xylene sulfonate, Sorbitan cocoate, Sorbitan monolaurate, Sorbitan monooleate, Sorbitan monopalmitate, Sorbitan monostearate, Sorbitan oleate decylglycoside crosspolymer, Sorbitan sesquioleate, Sorbitan trioleate, poly(oxy-1,2-ethanediyl) derivatives of Sorbitan monododecanoate, poly(oxy-1,2-ethanediyl) derivs of Sorbitan monooctadecanoate, poly(oxy-1,2-ethanediyl) derivatives of Sorbitan trioctadecanoate, Soybean oil fatty acids, sodium sal of sulfated Soybean oil, Stearic acid, sodium salt of C10-18 alkane Sulfonic acids, sodium salts of C14-16-alkane hydroxy and C14-16-alkene Sulfonic acids, sodium salts of petroleum sulfonic acids, Sulfuric acid mono-C10-16-alkyl esters ammonium salts, Sulfuric acid mono-C10-16-alkyl esters sodium salts, Sulfuric acid mono-C12-14 alkyl esters sodium salts, Sulfuric acid mono-C12-18-alkyl esters sodium salts, Sulfuric acid mono-C16-18-alkyl esters sodium salts, Sulfuric acid monodecyl ester sodium salt (1:1), Sunflower oil potassium salt, Tetradecanoic acid, Undecyl-D-glucoside.

In some embodiments, a combination of surfactants is chosen to enable a stable emulsion, (e.g., a micro- or a nano-emulsion) of the keto-carboxylic acid ester in the low molecular weight oxygen containing solvent.

In some embodiments, one or more co-solvents can also optionally be included in disclosed compositions. Illustrative co-solvents include one or more of the following: 1,1'-Dimethyldiethylene glycol, 1,2-Hexanediol, 1,3-Dioxolan-2-one, 4-ethyl-1-(2-Methoxy-1-methylethoxy)-2-propanol, 1-Dodecanol, 1-Methoxy-2-propanol, 1-Propoxy-2-propanol, 1-Undecanol, 2,2-dimethyl-1,3-Dioxolane-4-methanol, 2-Methyl-2,4-pentanediol, 3-Methoxybutyl acetate, 3-Methyl-3-methoxybutanol, 4-Hydroxymethyl-1,3-dioxolan-2-one, C10-16 Alcohols, C9-11 Alcohols, 3-hydroxy-Butanoic acid ethyl ester, Butyl-3-hydroxy-2-methylbutyrate, Butyl-3-hydroxybutanoate, Castor oil, Coconut alcohol, Dibutyl sebacate, Dimethyl adipate, Dimethyl ethylsuccinate, Dimethyl glutarate, Dimethyl succinate, Dipropylene glycol, Dipropylene glycol methyl ether, Dipropylene glycol propyl ether, Ethyl lactate, Ethyl-3-ethoxy propionate, Glycerides, mixed decanoyl and octanoyl, Glycerol, Glycerol octanoate decanoate, Isopropyl 3-hydroxybutyrate, Isopropyl myristate, Methyl laurate, Methyl oleate, 2-methyl-Pentanedioic acid 1,5-dimethyl ester, Pentylene glycol, 1 (or 2)-2-methoxymethyl ethoxy Propanol acetate, Propyl acetate, Propylene carbonate, Propylene glycol methyl ether acetate, Propylene glycol n-butyl ether, Tetraethylene glycol, Tripropylene glycol, Tripropylene glycol n-butyl ether, White mineral oil, petroleum. In some embodiments, one or more co-solvents can be utilized in combination with one or more surfactants.

In some embodiments, disclosed compositions can also optionally include one or more chelating agents. Chelating agents can be advantageously included in disclosed compositions that are supplied to a consumer in the form of a concentrate that will be diluted with water before use. In such instances, a chelating agent can account for the use of different water qualities, e.g., different amounts and identities of ions contained in the water. Ions, especially divalent ions in the water can affect the solubility and micelle properties of a final composition for the removal of a polymeric material containing heteroatoms. Chelating agents that target the divalent ions contained in water can buffer this effect and provide consistent properties to final compositions for use.

Illustrative specific chelating agents that can be useful in disclosed compositions can include one or more of: Sodium salt of N,N-bis(carboxymethyl)-Alanine (1:3), tetrasodium salt of N-(1,2-dicarboxyethyl)-Aspartic acid, 2-methylene-Butanedioic acid polymer with 2-propenoic acid and sodium 2-methyl-2-[(1-oxo-2-propen-1-yl)amino]-1-propanesulfonate, sodium salt of carboxymethyl ether Cellulose, anhydrous Citric acid, D-Gluconic acid, calcium salt (2:1) of D-glycero-D-gulo-Heptonicacid, monosodium salt of D-glycero-D-gulo-Heptonicacid, Dipotassium hydrogen citrate, L-Lactic acid, Monosodium D-glucoheptonate, N,N'-Ethylenediamine disuccinic acid, anhydrous Potassium citrate, Potassium citrate monohydrate, anhydrous Sodium citrate, Sodium citrate dehydrate, Sodium ethylene diamine disuccinate, Sodium glucarate, Sodium gluconate, Starch, carboxymethyl ether, Tetrasodium N,N-bis(carboxylatomethyl)-L-glutamate Disclosed compositions can optionally include one or more thickeners. Optional thickeners can be used to form relatively viscous compositions. Such compositions may be useful for application of the composition to mostly vertical surfaces so it does not run off Illustrative specific thickeners that can optionally be included in disclosed compositions can include, for example one or more of: polymer of 2,5-Furandione with 1-propene, sodium salt of polymer of 2,5-Furandione with 2,4,4-trimethylpentene, ammonium salt of polymer of 2,5-Furandione with ethenylbenzene, ammonium salt of 2,5-Furandione telomer with ethenylbenzene and (1-methylethyl)benzene, sodium salt of 2,5-Furandione telomer with ethenylbenzene and (1-methylethyl)benzene, 2-Butenedioic acid (2Z) polymer with 2-propenoic acid, 2-methyl-2-Propenoic acid butyl ester, polymer with butyl 2-propenoate and methyl 2-methyl-2-propenoate, 2-methyl-2-Propenoic acid butyl ester, polymer with ethenylbenzene, 2-methyl-2-Propenoic acid butyl ester, polymer with methyl 2-methyl-2-propenoate, 2-methyl-2-Propenoic acid dodecyl ester polymer with hexadecyl 2-methyl-2-propenoate octadecyl 2-methyl-2-propenoate and tetradecyl 2-methyl-2-propenoate, 2-methyl-2-Propenoic acid methyl ester polymer with ethenylbenzene and 2-propenoic acid, sodium salt of 2-methyl-2-Propenoic acid polymer with 2-propenoic acid, 2-methyl-2-Propenoic acid polymer with butyl 2-methyl-2-propenoate butyl 2-propenoate ethenylbenzene and methyl 2-methyl-2-propenoate, 2-methyl-2-Propenoic acid polymer with butyl 2-propenoate, 2-methyl-2-Propenoic acid polymer with butyl 2-propenoate and ethenylbenzene, 2-methyl-2-Propenoic acid polymer with butyl 2-propenoate and methyl 2-methyl-2-propenoate, 2-methyl-2-Propenoic acid polymer with butyl 2-propenoate (1-methylethenyl)benzene and methyl 2-methyl-2-propenoate, 2-methyl-2-Propenoic acid polymer with butyl 2-propenoate ethene ethenylbenzene ethyl 2-propenoate and methyl 2-methyl-2-propenoate, 2-methyl-2-Propenoic acid polymer with butyl 2-propenoate ethenylbenzene and methyl 2-methyl-2-propenoate, calcium salt of 2-methyl-2-Propenoic acid polymer with butyl 2-propenoate ethenylbenzene and methyl 2-methyl-2-propenoate, 2-methyl-2-Propenoic acid polymer with butyl 2-propenoate ethenylbenzene ethyl 2-propenoate and methyl 2-methyl-2-propenoate, 2-methyl-2-Propenoic acid polymer with butyl 2-propenoate ethenylbenzene methyl 2-methyl-2-propenoate and 2-propenenitrile, 2-methyl-2-Propenoic acid polymer with ethenylbenzene, 2-methyl-2-Propenoic acid polymer with ethenylbenzene and methyl 2-methyl-2-propenoate, 2-methyl-2-Propenoic acid polymer with ethenylbenzene ethyl 2-propenoate methyl 2-methyl-2-propenoate and 1,2-propanediol mono(2-methyl-2-propenoate), 2-methyl-2-Propenoic acid polymer with ethyl 2-propenoate, 2-methyl-2-Propenoic acid polymer with methyl 2-methyl-2-propenoate, 2-methyl-2-Propenoic acid polymers with Et acrylate and polyethylene glycol methacrylate C16-18-alkyl ethers methacrylic acid polymer, 2-Propenoic acid homopolymer, sodium salt of 2-Propenoic acid homopolymer, sodium salt 2-Propenoic acid polymer with 2,5-furandione, potassium salt (1:1) of 2-Propenoic acid polymer with 2-propenamide, sodium salt 2-Propenoic acid telomer with sodium hydrogen sulfite, 2-Propenoic acid telomer with sodium sulfite (1:1), sodium salt of Aspartic acid homopolymer, sodium salt (1:1) of hydroxy-Benzenesulfonic acid, polymer with formaldehyde and 4,4'-sulfonylbis[phenol], sodium salt of 2-methylene-Butanedioic acid polymer with 2-propenoic acid, 3-oxo-Butanoic acid-2-[(2-methyl-1-oxo-2-propen-1-yl)oxy]ethyl ester polymer with butyl 2-propenoate, 2-ethylhexyl 2-propenoate, methyl 2-methyl-2-propenoate, 2-methyl-2-propenoic acid and 2-propen-1-yl 2-methyl-2-propenoate, oxidized Ethene homopolymer, Ethylene/acrylic acid copolymer, Glycerol poly(oxyethylene) ether, Guar gum, 2-hydroxypropyl ether, 12-hydroxy-Octadecanoic acid polymer with alpha-hydro-omega-hydroxypoly(oxy-1,2-ethanediyl), 2-methyl-Oxirane polymer with oxirane ether with 1,2-propanediol (2:1), Polybutene, Polyethylene glycol, Polymaleic acid, Polymethacrylic acid, Polypropylene, Polyvinyl alcohol, Polyvinylpyrrolidone, Sodium ligninsulfonate, Sodium polyaspartate, Sodium polymethacrylate, Sodium polymethacrylate, chloride of 2-carboxyethyl 2-methyl-3-oxo-3-[[3-(trimethylammonio)propyl]amino]propyl ether Starch, sodium salt of Syrups and hydrolyzed starch polymers with acrylic acid and maleic anhydride initiated with hydrogen peroxide- and peroxydisulfuric acid ([HO)S(O)2]2O2), Vinyl acetate vinyl alcohol polymer.

Disclosed compositions can optionally include one or more emollients. Inclusion of emollient(s) may be useful in obtaining desired viscosity properties. Illustrative specific emollients can include one or more of the following: 1-Docosanol, 1-Eicosanol, 1-Octadecanol, *Astrocaryum murumuru* seed butter, *Borago officinalis* seed oil, *Camellia kissi* seed oil, Cetyl acetate, Cocoa butter, *Cuburbita pepo* seed oil, Dipropylene glycol dibenzoate, Fats and Glyceridic oils, sesame, C16-18 and C18-unsatd. mono-Glycerides, C8-18 and C18-unsatd. Glycerides, coco mono- and di-ethoxylated Glycerides, coco mono- and di-ethoxylated propoxylated Glycerides, Glyceryl dioleate, Isoamyl laurate, Isopropyl palmitate, Oenothera biennis (evening primrose) oil, palm kernel Oil, wheat Oils, *Orbignya oleifera* seed oil, Squalane, Sunflower oil.

In some embodiments, disclosed compositions can include both one or emollients and one or more thickeners. Such compositions can be advantageous as they provide compositions having desired viscosities.

Disclosed compositions can also optionally include one or more processing aids. Processing aids can be useful in affecting desired viscosities, emulsion stability, abrasive characters, or combination thereof. Illustrative specific processing aids can include one or more of: Acetic acid, Adipic acid, alpha-Methylglucoside, Ascorbic acid, Bentonite, Betaine, Calcium acetate, Calcium carbonate, Calcium carbonate hexahydrate, Calcium chloride hexahydrate, Calcium chloride hydrate (unspecified), anhydrous Calcium chloride, Calcium chloride dehydrate, Calcium citrate, Calcium citrate tetrahydrate, Calcium formate, Calcium hydroxide, Calcium hydroxide hydrate, Calcium magnesium acetate, Calcium silicate, Calcium silicate hydrate, Canola oil, Carrageenan, Castor oil, hydrogenated, Cellulose, 2-hydroxypropyl methyl ether Cellulose, Cellulose regenerated, Ceramic materials and wares, chemicals, Coconut oil, Corn gluten protein, Corn oil, Corn sugar syrup, D-Glucose, Dextrin, Disodium disilicate, DL-Lactic acid, Formic acid, Fumaric acid, Glass fibers, Gluconolactone, Glycine, Guar gum, Hectorite, Hydroxyethyl cellulose, Hydroxypropylcellulose, sodium salt of Inulin carboxymethyl ether, Kaolin, Kaolin calcined, Lanolin oil, Limestone, Magnesium acetate, Magnesium acetate tetrahydrate, Magnesium carbonate, Magnesium carbonate hydrate, Magnesium chloride anhydrous, Magnesium chloride hexahydrate, Magnesium hydroxide, Magnesium hydroxide carbonate, Magnesium oxide, Magnesium sulfate monohydrate, Magnesium sulfate, anhydrous, Magnesium sulfate heptahydrate, Malic acid, Maltodextrin, Methanesulfonic acid, Methyl cellulose, Molasses blackstrap, Nepheline syenite, Olive oil, Palm oil, PEG-120 methyl glucose trioleate, Perlite, Polyglycerol, Potassium acetate, Potassium acetate hydrate, Potassium bicarbonate, Potassium carbonate sesquihydrate, Potassium carbonate anhydrous, Potassium chloride, Potassium hydroxide, Potassium hydroxide monohydrate, Potassium lactate, Potassium silicate, Potassium sulfate, Potassium tartrate, Pumice, 1,1,1-trimethyl-N-(trimethylsilyl)-Silanamine hydrolysis products with silica, Silica, Silica gel, Silicic acid disodium salt pentahydrate, Silicon carbide, Smectite-group minerals, Sodium acetate, Sodium acetate hydrate, Sodium acetate trihydrate, Sodium bicarbonate, Sodium bisulfate, Sodium bisulfate monohydrate, Sodium carbonate anhydrous, Sodium carbonate monohydrate, Sodium chloride, Sodium dihydrogen citrate, Sodium formate, Sodium hydroxide, Sodium lactate, Sodium lactate, Sodium magnesium silicate, Sodium metasilicate, Sodium propionate, Sodium sesquicarbonate, Sodium silicate, Sodium starch, glycolate, Sodium sulfate, Sodium sulfite, Sodium thiosulfate, Sodium thiosulfate pentahydrate, Sorbitol, Soybean oil, Starch, 2-hydroxypropyl ether Starch, Sucrose, Sulfamic acid, Sulfurous acid monosodium salt, Tartaric acid, Taurine, Titanium (IV) oxide, Triglycerol, Urea methanesulfonate (1:1), Vinegar, Jojoba Waxes and Waxy substances, Xanthan gum, Zeolites, Zeolites NaA.

Disclosed compositions can be in any useful form. Illustrative specific useful forms can include liquids (e.g., a ready to use formulation or a concentrate), pastes, or an aerosol for example. Compositions can also be impregnated into a substrate, e.g., a wipe.

Disclosed compositions are useful for the removal of polymeric materials containing one or more heteroatoms. Polymeric materials containing heteroatoms include for example polyurethanes, epoxy resins, vinyl based resins, acrylic acid based resins such as vinyl acetate resins its polymers and co-polymers, polyesters and copolymers, polyamides acrylic resins, amino resins, cyanoacrylates, polyethers, polycarbonates, alkyd resins, natural polymers such as mastic, rosins, natural resins such as pine tree sap, natural rubber, shellac. These polymers are used in combination with pigments and other components to make materials comprising polymers containing heteroatoms such as coatings such as paints, finishes, varnishes, and inks, adhesives, sealants or used as such in molds, calendared coatings, coextruded coatings, spunbond textile coatings, thermoformed coatings and other processing equipment to make a variety of products. Once the lifetime of these polymers has passed, these polymers need to be removed from the surfaces. Removal of a polymeric material containing heteroatoms can be useful in a variety of applications such paint stripping and removal and cleaning surfaces of inks, paints, coatings, adhesives, resins, or varnishes.

In some embodiments, disclosed compositions can be useful for removal of graffiti from a surface. Graffiti often includes paint, ink, mastic, adhesive, or combinations thereof.

Surfaces form which polymeric materials can be removed can include, for example glass, stone, ceramic, porcelain, concrete, masonry, wood and wood derived composites and products, leather, metals, and polymeric surfaces such as polyolefins, engineering thermoplastics and engineering thermoplastic composites, elastomers, natural and polyolefin based textiles.

Disclosed herein are methods of using compositions to remove polymeric materials from a surface. Such methods include steps of contacting the composition with the surface and removing the composition from the surface. In some embodiments, the composition can be removed from the surface by wiping the composition and at least some portion of the polymeric material from the surface. In some embodiments, there can be a delay between the steps of contacting the composition with the surface and removing the composition from the surface. In some embodiments where acrylic paint is being removed, the composition can remain on the surface at least 5 minutes or at least 10 minutes. In some embodiments where oil based paint is being removed, the composition can remain on the surface at least 15 minutes or at least 20 minutes, or 15 to 30 minutes for example. In some embodiments where permanent marker is being removed from a whiteboard for example, the composition does not need to remain on the surface for more than 5 seconds, or not more than 10 seconds. In some embodiments where acrylic adhesive is being removed, the composition can remain on the surface for 1 minute. In some embodiments where silicone adhesive is being removed, the composition can remain on the surface at least 1 minute or not less than 5 minutes. The step of removing the composition from the surface can be accomplished using any method of wiping, e.g., wiping with a wipe such as a paper towel, etc.; wiping with a sponge; etc. In some embodiments, a composition can be impregnated into a substrate (e.g, a wipe, etc.); and in some such instances, contacting the surface can include placing the impregnated substrate over the polymeric material to be removed so that the composition impregnated into the substrate can contact the polymeric material on the surface.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a composition that "comprises" silver may be a composition that "consists of" silver or that "consists essentially of" silver.

"Consisting essentially of," as it relates to a composition, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects is present. For example, a "second" substrate is merely intended to differentiate from another substrate (such as a "first" substrate). Use of "first," "second," etc. in the description above and the claims that follow is also not necessarily intended to indicate that one comes earlier in time than the other.

Example articles and techniques according to the disclosure provide will be illustrated by the following non-limiting examples.

EXAMPLES

Example 1

A stock solution was prepared by mixing 10 g of Butyl Levulinate and 10 g of the surfactant Biosoft N-900 (Stepan Company). 181.2 g of water was added under vigorous stirring resulting in a milky mixture. 10.07 g of the stock solution was transferred into a second container and 3.05 g Dipropyleneglycol (Dowanol) was added resulting in a clear solution.

Example 2

10.34 g of the stock solution of example 1 was transferred to a second container and n-butyl-propyleneglycol ether (Dowanol PNB) was added in 0.5 g increments. Spontaneous phase separation occurred after the addition of 2.5 g. Adding higher amounts up to 4.05 g did not result in a stable solution.

Example 3

A whiteboard cleaning formulation was prepared by mixing 10 g butyllevuliniate and 10 g of the surfactant Biosoft N-900 (Stepan Company). The butyllevulinate surfactant solution was diluted with 194 g water yielding a slightly milky emulsion. 30 g of isopropanol was added yielding a clear solution. A new whiteboard (UBrands purchased at Target) was subjected to writing with
1. Sharpie permanent marker
2. Expo Dry Erase Marker green
3. UBrands Dry Erase Marker black
4. Message Star Dry Erase Marker black
5. Ubrands Dry Erase Marker blue
6. Megabrands Dry Erase Marker orange The inks on the whiteboard were allowed to sit for 3 weeks, simulating a difficult cleaning task on the whiteboard. The whiteboard was treated with the following whiteboard cleaners: the composition of Example 3, Expo Whiteboard CARE™, Sustainable Earth™ Whiteboard cleaner as follows: the liquid of 5 pumps of a cleaner was sprayed on a defined section of the whiteboard. The cleaner was allowed to sit for 30 seconds. The whiteboard was wiped once with a clean regular kitchen use paper towel.

The composition of Example 3 provided a clean surface with the first wipe erasing all marks and restoring the surface completely. Both Expo Whiteboard CARE™ and Sustainable Earth™ Whiteboard cleaner were effective in removing the dry erase markers but both did not remove the permanent marker while the composition of Example 3 did remove the permanent marker completely.

Figure 2:
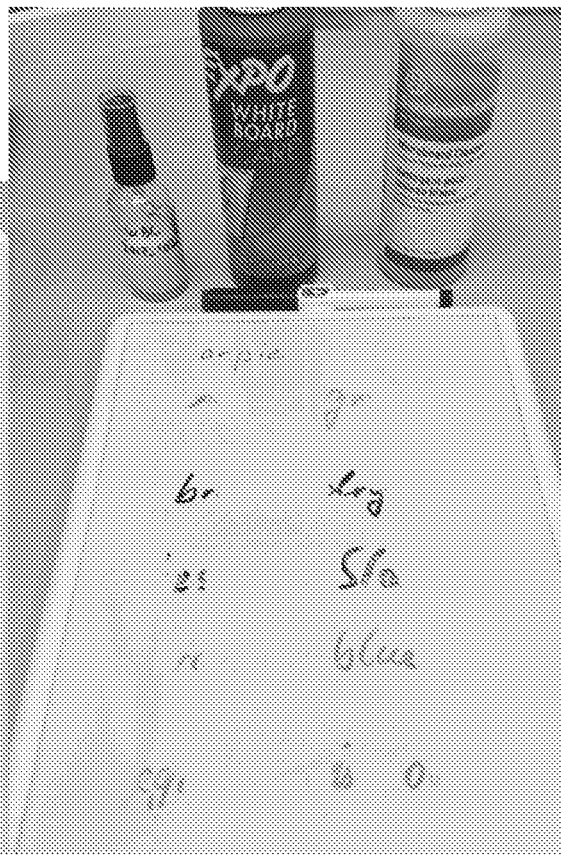
FIG. 2 shows the same whiteboard as in FIG. 1 after cleaning with a composition for removal of a polymeric material containing heteroatoms and competitive products. Only the composition for removal of a polymeric material containing heteroatoms is effective against permanent marker.
Figures 3, 4:
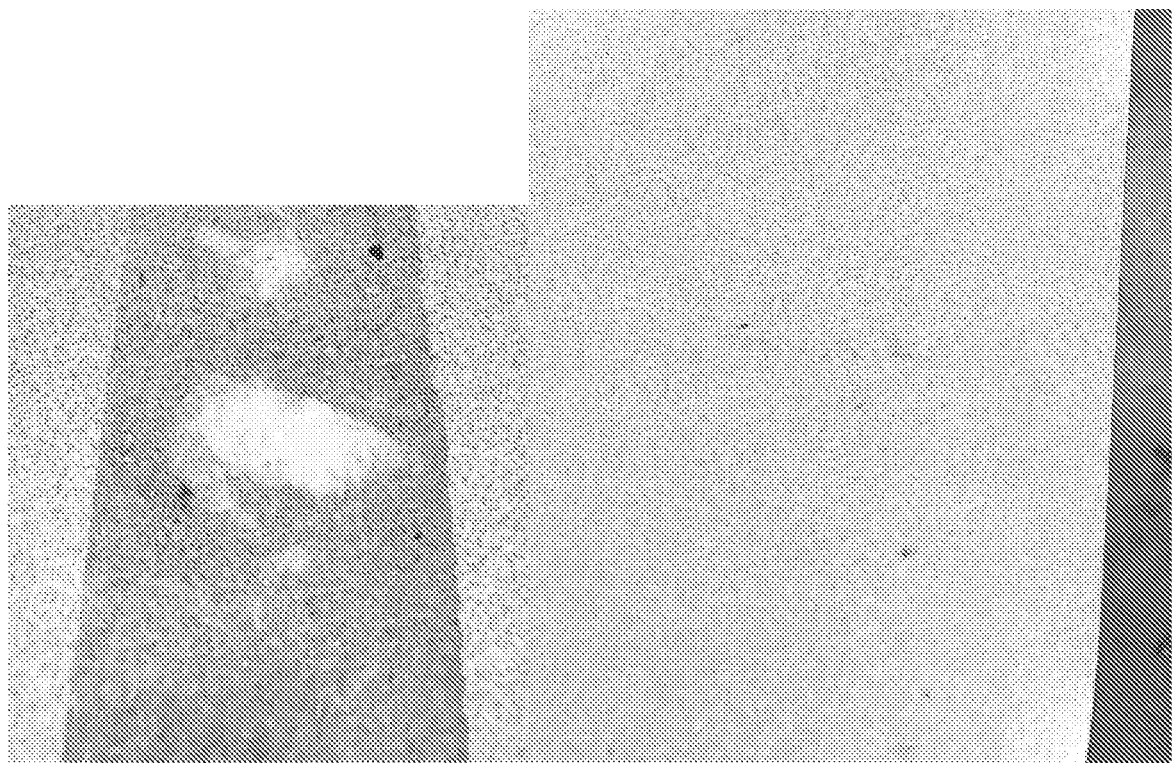
FIG. 3 shows adhesive left behind on a table after lifting an adhesive tape.
FIG. 4 shows the removed adhesive tape after treatment with a disclosed composition.

FIG. 1 shows the whiteboard before cleaning. FIG. 2 shows the same whiteboard as in FIG. 1 after cleaning with the composition of Example 3, Expo Whiteboard CARE™, Sustainable Earth™ Whiteboard cleaner. Only the composition of Example 3 was effective in cleaning the permanent marker.

Example 4

An adhesive removal composition was prepared by adding 10 g of the Stock Solution of Example 1 to 10 g of water under vigorous stirring. The solution was applied to an adhesive that had been left behind after pulling off an adhesive tape that had been on a plastic-coated table surface (melamine formaldehyde coating). The composition was left on the adhesive for 30 seconds and then wiped with a few swipes of a paper towel for regular kitchen use. The table surface was not harmed and the adhesive was removed.

Example 5

Preparation of Paint Coupons

A 4 inch by 8 inch plywood panel was sanded with a 180 grit sandpaper. The sanding dust was removed and the panel was painted with a water based primer (ZINSSER®, Rust-oleum Corporation, Vernon Hills Ill.). After 24 hours of drying time, the primer was sanded with 180 grit sandpaper and wiped with a cloth wetted with isopropyl alcohol.

A layer of blue exterior oil paint (Rust-oleum Corporation, Vernon Hills, Ill.) was applied, allowed to dry for 24 hours before sanding with 180 grit sandpaper and wiping with a cloth wetted with isopropyl alcohol. A layer of white exterior/interior latex paint (Rust-oleum Corporation, Vernon Hills, Ill.) was applied, allowed to dry for 24 hours before sanding with 180 grit sandpaper and wiping with a cloth wetted with isopropyl alcohol. A layer of red exterior/interior latex paint (Rust-oleum Corporation, Vernon Hills, Ill.) was applied, allowed to dry for 24 hours before sanding with 180 grit sandpaper and wiping with a cloth wetted with isopropyl alcohol. A layer of yellow exterior oil paint (Rust-oleum Corporation, Vernon Hills, Ill.) was applied, allowed to dry for 24 hours before sanding with 180 grit sandpaper and wiping with a cloth wetted with isopropyl alcohol.

The panel was allowed to dry for 72 hours upon which it was cured for 30 days at 60° C. in an incubator.

Example 6

A 1 inch inner diameter gasket was glued to the Paint coupons as described in example 5 with superglue to hold any liquid paint stripper formulation contained within the ring.

The following paint stripper formulation was prepared:

| | |
|---|---:|
| Butyl Levulinate (Sigma Aldrich, St. Louis MO) | 7.15 g |
| Isopropyl alcohol (Shell, Netherlands) | 3.86 g |
| Propylene Carbonate (Nexeo Solutions, Inc.) | 5.87 g |
| 9-decenoic acid, methyl ester (Elevance Renewable Sciences, Woodridge, IL) | 6.52 g |
| Water (deionized) | 1.60 g |
| Total | 25.00 g |

Figure 5C:
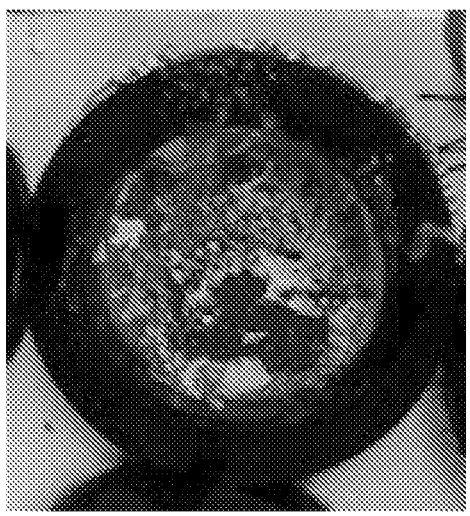
FIGS. 5A, 5B, and 5C show a four layer paint coupon after contact with a disclosed composition after 20 minutes (FIG. 5A), 40 minutes (FIG. 5B) and 60 minutes (FIG. 5C).
Figure 5B:
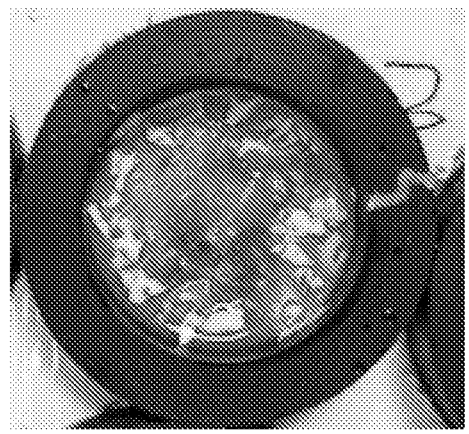
Figure 5A:
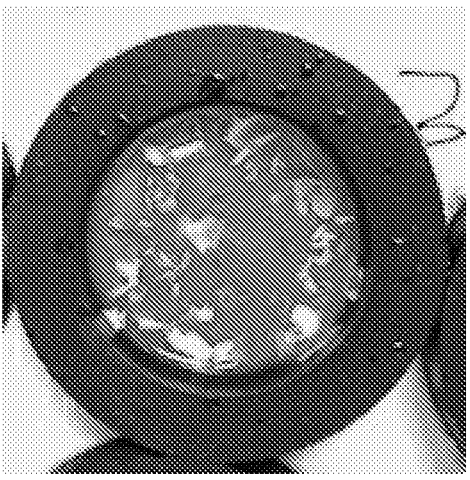

2.5 mL of the paint stripper formulation was applied to the gaskets and covered with a watch glass to prevent evaporation. After 20 minutes the paint stripper formulation was removed with a pipette and the paint was scraped with a wooden scraper. 95% of the yellow oil paint was removed and the red latex paint was in the process of dissolving (FIG. 5A, 20 minutes). The paint stripper formulation was re-applied and after another 20 minutes the scraping procedure was repeated. 85% of the yellow and 50% of the red and white paint layers were removed (FIG. 5B, 40 minutes). The paint stripper formula was re-applied and after another 20 minutes the scraping procedure was repeated. 85% of the yellow, red and white paint layers as well as 40% of the blue paint layers were removed (FIG. 5C, 60 minutes).

The paint stripper showed effectiveness on 4 layers of mixed paint within 60 minutes.

COMPARATIVE EXAMPLES

A 1 inch inner diameter gasket was glued to a coupon as described in example 5 with superglue to hold any liquid paint stripper formulation contained within the ring.

Comparative Paint Stripper Formulation A

The following comparative paint remover formulation was prepared:

| | |
|---|---:|
| Butyl Levulinate (Sigma Aldrich, St. Louis MO) | 8.85 g |
| Butyl Carbitol (Dow) | 16.15 g |
| Total | 25.00 g |

Figure 6C:
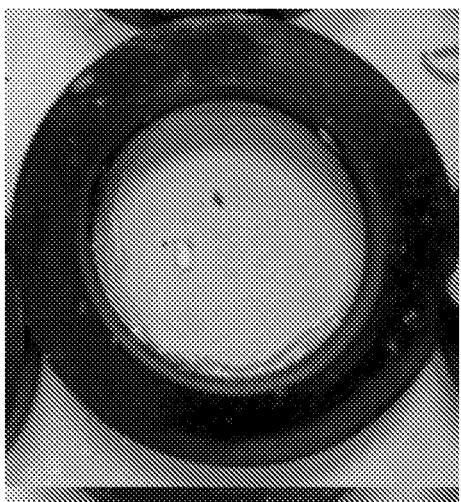
FIGS. 6A, 6B, and 6C show a four layer paint coupon after contact with a comparative composition after 20 minutes (FIG. 6A), 40 minutes (FIG. 6B) and 60 minutes (FIG. 6C).
Figure 6B:
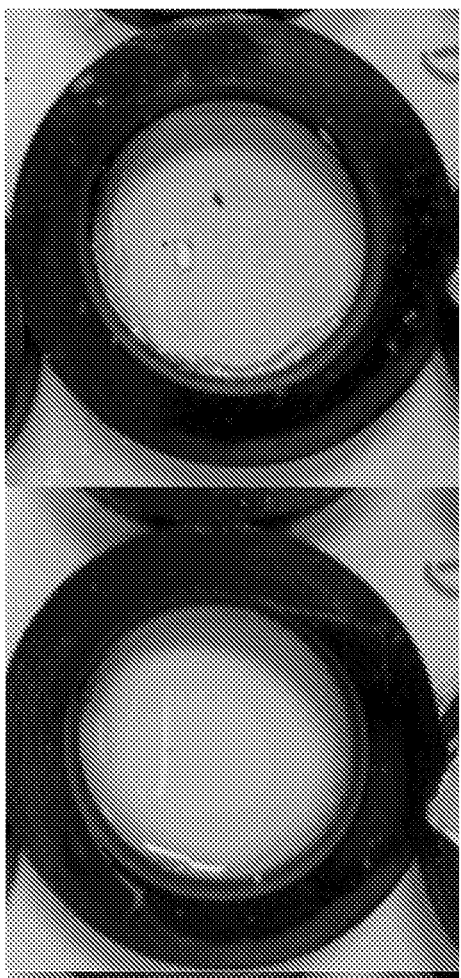
Figure 6A:
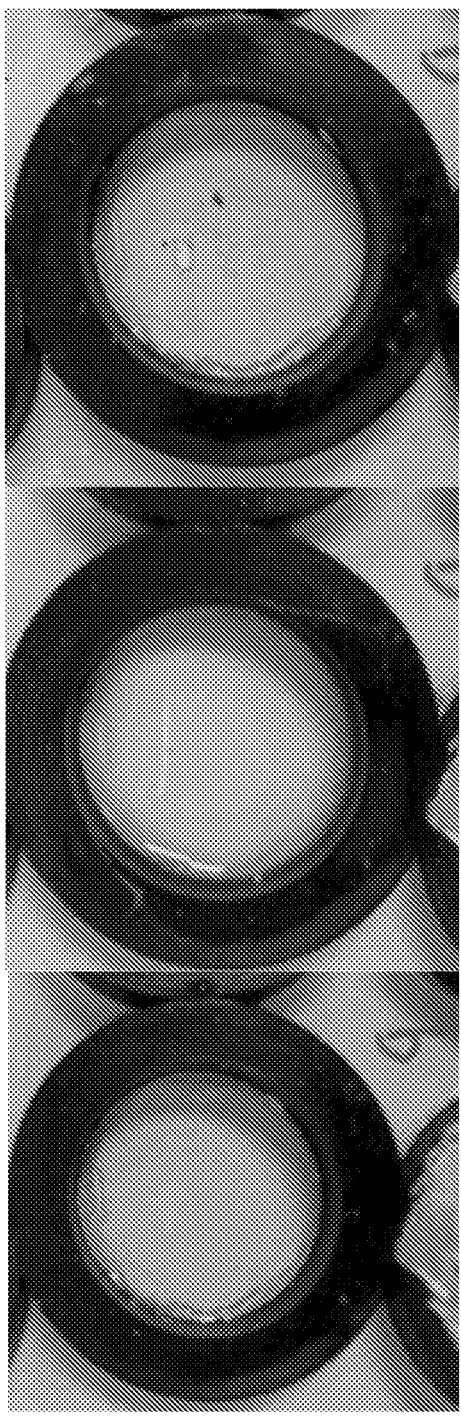

2.5 mL of the comparative paint stripper formulation was applied into the gasket and covered with a watch glass to prevent evaporation. After 20 minutes the paint stripper formulation was removed with a pipette and the paint was scraped with a wooden scraper. No change was visible (FIG. 6A, 20 minutes). The comparative paint stripper formulation was re-applied and after another 20 minutes the scraping procedure was repeated. No change was visible (FIG. 6B, 40 minutes). The comparative paint stripper formulation was re-applied and after another 20 minutes the scraping procedure was repeated No change was visible (FIG. 6C, 60 minutes).

The comparative paint stripper formulation showed no effectiveness even after 60 minutes.

Comparative Paint Stripper Formulation B

A 1 inch inner diameter gasket was glued to a coupon as described in example 5 with superglue to hold any liquid paint stripper formulation contained within the ring.

The following paint remover formulation was prepared:

| | |
|---|---:|
| Butyl Levulinate (Sigma Aldrich) | 25.00 g |
| Total | 25.00 g |

2.5 mL of Comparative paint stripper formulation B was applied into the gasket and covered with a watch glass to prevent evaporation. After 20 minutes the paint stripper formulation was removed with a pipette and the paint was scraped with a wooden scraper. No change was visible after the 20 minutes exposure. The paint stripper formula was re-applied and after another 20 minutes the scraping procedure was repeated. No change was visible after a total of 40 minutes exposure. The paint stripper formula was re-applied and after another 20 minutes the scraping procedure was repeated No change was visible after a total of 60 minutes exposure.

Comparative paint stripper formulation B showed no effectiveness after 60 minutes.

Thus, embodiments of compositions including keto ester compounds are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of removing an ink composition or a paint composition, the ink composition or paint composition comprising polymeric material comprising heteroatoms from a surface the method comprising:
    contacting the ink composition or paint composition on the surface with a composition, the composition comprising:
    at least one compound according to formula (I)

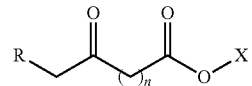

wherein R is a C1-C6 alkyl;
   X is a C1-10 alkyl; and
   n is an integer from 0 to 5; and
   at least one oxygen containing solvent having a molecular weight of not greater than 130 g/mol; and
   wiping the composition and at least some portion of the ink composition or paint composition from the surface.

2. The method according to claim 1, wherein n is 1 or 2.
3. The method according to claim 1, wherein X is methyl.
4. The method according to claim 1, wherein R is a C2 to C4 alkyl.
5. The method according to claim 1, wherein the oxygen containing solvent is selected from ethanol, ethylene glycol, 2-propanol, propylene glycol, 1,2-butanediol, 1,3-butanediol, glycerol, methyl-propylene glycol, dipropylene glycol, water, and combinations thereof.

6. The method according to claim 1, wherein the oxygen containing solvent is water.

7. The method according to claim 1, wherein the oxygen containing solvent is present in the composition in an amount of not less than 50 wt % and not greater than 95 wt % based on the total weight of the entire composition.

8. The method according to claim 1, wherein the oxygen containing solvent is present in the composition in an amount of not greater than 75 wt % based on the total weight of the entire composition.

9. The method according to claim 1, wherein the composition further comprises emollients, chelating agents, preservatives, oxidants, processing aids, thickeners, or combinations thereof.

10. The method according to claim 1, wherein the composition comprises one or more surfactants.

11. The method according to claim 1, wherein the composition comprises one or more co-solvents.

12. The method according to claim 1, wherein the composition further comprises one or more surfactants, one or more thickeners, and one or more co-solvents.

13. The method according to claim 1, wherein the composition is a liquid, a concentrate, a paste, or an aerosol.

14. The method according to claim 1, wherein the polymeric material is selected from: polyurethanes, epoxy resins, vinyl based resins, acrylic acid based resins, polyesters and copolymers, polyamindes acrylic resins, amino resins, cyanoacrylates, polyethers, polycarbonates, alkyd resins, natural polymers, natural resins.

15. The method according to claim 1, wherein the polymeric material is an ink.

16. The method according to claim 1, wherein the surface is selected from: glass, stone, ceramic, porcelain, concrete, masonry, wood and wood derived composites and products, leather, metals, and polymeric surfaces.

17. The method according to claim 1, wherein the surface is selected from: polyolefins, engineering thermoplastics and engineering thermoplastic composites, elastomers, natural and polyolefin based textiles.

18. A method of removing an ink composition or a paint composition, the ink composition or paint composition comprising polymeric material comprising heteroatoms from a surface the method comprising:
    contacting the ink composition or paint composition on the surface with a composition, the composition comprising:
    at least one compound according to formula (II)

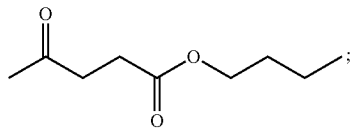

and
    not less than 20% by weight to not greater than 95% by weight with respect to the total weight of the composition of at least one oxygen containing solvent having a molecular weight of not greater than 130 g/mol; and
    wiping the composition and at least some portion of the ink composition or paint composition from the surface.

19. The method according to claim 18, wherein the oxygen containing solvent is present in the composition in an amount of not greater than 75 wt % based on the total weight of the entire composition.

* * * * *